United States Patent Office.

GEORGE JÁQUES, OF BOSTON, MASSACHUSETTS.

Letters Patent No. 107,690, dated September 27, 1870.

IMPROVEMENT IN COMPOSITION OF MATTER FOR PRESERVING FRUITS FROM DECAY.

The Schedule referred to in these Letters Patent and making part of the same.

To all whom it may concern:

Be it known that I, GEORGE JÁQUES, of Boston, in the county of Suffolk and Commonwealth of Massachusetts, have invented a new and improved Composition of Matter to be Used in Preserving Fruits from Decay; and that the following is a full and exact description thereof.

My invention is founded upon the recent discovery in vegetable physiology that the rotting of fruits is produced by fungoid vegetation, and that if the spores of such funguses can be prevented from germinating or growing, the fruit can be preserved from decay for an indefinite period.

The nature of my invention consists in producing a paper, which, being used for wrapping or packing fruit intended for transportation or preservation, effectually preserves it from decay.

I have discovered that flowers of sulphur, used in the packing of fruit, effectually prevent the growth of fungoid vegetation, and arrest fermentation; and the object of my invention is so to combine sulphur with paper that fruit wrapped in such paper may be indefinitely preserved.

To make this paper, I mix the flowers of sulphur, or pulverized sulphur, with the pulp of paper, in the same manner as clay or other earthy or mineral material is mixed with paper-pulp while in the vats.

The paper is manufactured, in other respects, as in the ordinary methods.

The paper so produced may be used for wrapping fruits and vegetables in the same manner as ordinary paper.

What I claim as my invention is—

The composition of matter, consisting of paper impregnated with flowers of sulphur, or pulverized sulphur, for the uses and purposes as above described.

GEORGE JÁQUES.

Witnesses:
WILLIAM A. HAYES, Jr.,
C. E. CRAM.